United States Patent Office
2,942,048
Patented June 21, 1960

2,942,048
CURRENT COLLECTOR FOR AN ELECTRIC ARC FURNACE

Arthur A. Kirscht, Pittsfield, Mass., and David J. Klee, Shelbyville, Ind., assignors to General Electric Company, a corporation of New York Filed Feb. 25, 1959, Ser. No. 795,502

5 Claims. (Cl. 13—17)

This invention relates to electric arc furnaces and, more particularly, to a novel and improved current collector particularly adapted for use with an electric arc furnace of the consumable electrode type.

Electric arc furnaces of the consumable electrode type generally comprise a crucible and an electrode housing aligned with the crucible and containing an electrode supported for movement relative to the housing and crucible. The furnace is operated by striking an arc between the electrode and the bottom of the crucible, whereby the arc will consume the electrode which is fabricated from the material which it is desired to melt. It is, of course, necessary to provide some means for providing electric current to the electrode as it is advanced during the melting operation. The problems encountered in providing a high ampere connection to a moving electrode contained within a housing will, of course, be obvious; and these problems are further complicated in a so-called vacuum arc melting furnace wherein the interior of the electrode housing and crucible is evacuated or at least is under a pressure substantially less than atmospheric.

Heretofore, various means have been utilized to connect the electrode of an electric arc furnace of the consumable electrode type. One such means is generally referred to as a stinger type arrangement, wherein the electrode is carried by an elongated member extending outwardly through the end of the electrode housing opposite the crucible with long flexible leads connecting the stinger to a source of electrical power. This stinger, which may be water cooled, necessitates the use of a sliding vacuum seal where the stinger extends through the electrode housing. Inasmuch as the stinger must, when the electrode is in a starting position, extend beyond the housing a distance at least equal to the normal electrode advance, the headroom requirement of the furnace is often much greater than might be desired. These disadvantages together with other obvious disadvantages of increased manufacturing tolerances and cost have made it desirable to find other means for supporting the electrode within the housing and also for connecting the electrode to an external source of power.

In order to avoid long, flexible electric cables connected to the stinger of the above-described type of furnace, there have been used sliding shoe contact assemblies fixed within the furnace housing which slidably engage the electrode to connect the same to a source of power. However, in current connectors of this type, the shoe assembly may have to be changed with each change in electrode diameter and possibly for different cross sectional configurations. Also, there is a possibility that the particles of material may be worn off the contact shoes and drop into the crucible, thus contaminating the metal.

A novel means for supporting the electrode within the electrode housing as well as for connecting the electrode to a source of external power is described and claimed in copending application Serial No. 718,071, filed February 27, 1958, in the name of Richard A. Lyman, the assignee of that application being also the assignee of this application. The furnace of this aforementioned copending application avoids the disadvantages of the stinger type furnace and sliding shoe contact assemblies by movably supporting an electrode support entirely within an elongated hollow metal member and providing contact means on the support slidably engaging the inner wall of the hollow member. The hollow member is connected to a source of electrical power to provide a current path through the hollow member to the contacts and through the support to the electrode. However, it has been found to be desirable to reduce the heating due to $I^2R$ losses of the specific current collector shown in the aforementioned copending application as well as to provide a simpler and less costly device which will not require any substantial machining of the inner wall of the hollow metal member forming the electrode housing.

Accordingly, it is the object of this invention to provide a novel and improved current collector of a type adapted to be mounted for movement with an electrode support disposed entirely within an electrode housing, with the current collector being in sliding electrical contact with the inner wall of the housing and electrically connected to the electrode, which will provide a reduction in $I^2R$ losses, which will substantially eliminate the need for providing a smooth surface on the inner surface of the electrode housing in order to provide a good sliding electrical contact between the current collector and housing, and which will be of simpler and more economical construction. Other objects and advantages will be in part obvious and in part pointed out in detail hereinafter.

The objects of the invention are met in the provision of a current collector adapted to be mounted for movement with an electrode along a path extending longitudinally with a cylindrical electrode housing, with the current collector comprising a plurality of sets of flat leaf-type contacts of resilient electrically conducting material and with each set of contacts including a plurality of such leaves extending generally chordally within the housing with opposite ends of the leaves in sliding electrical contact with the inner wall of the housing.

The advantages and more specific details of this structure will be apparent from a consideration of the following detailed description taken in connection with the accompanying drawings, in which:

Fig. 3 is an enlarged perspective view of the current collector of the furnace of Fig. 1.

Figure 1:
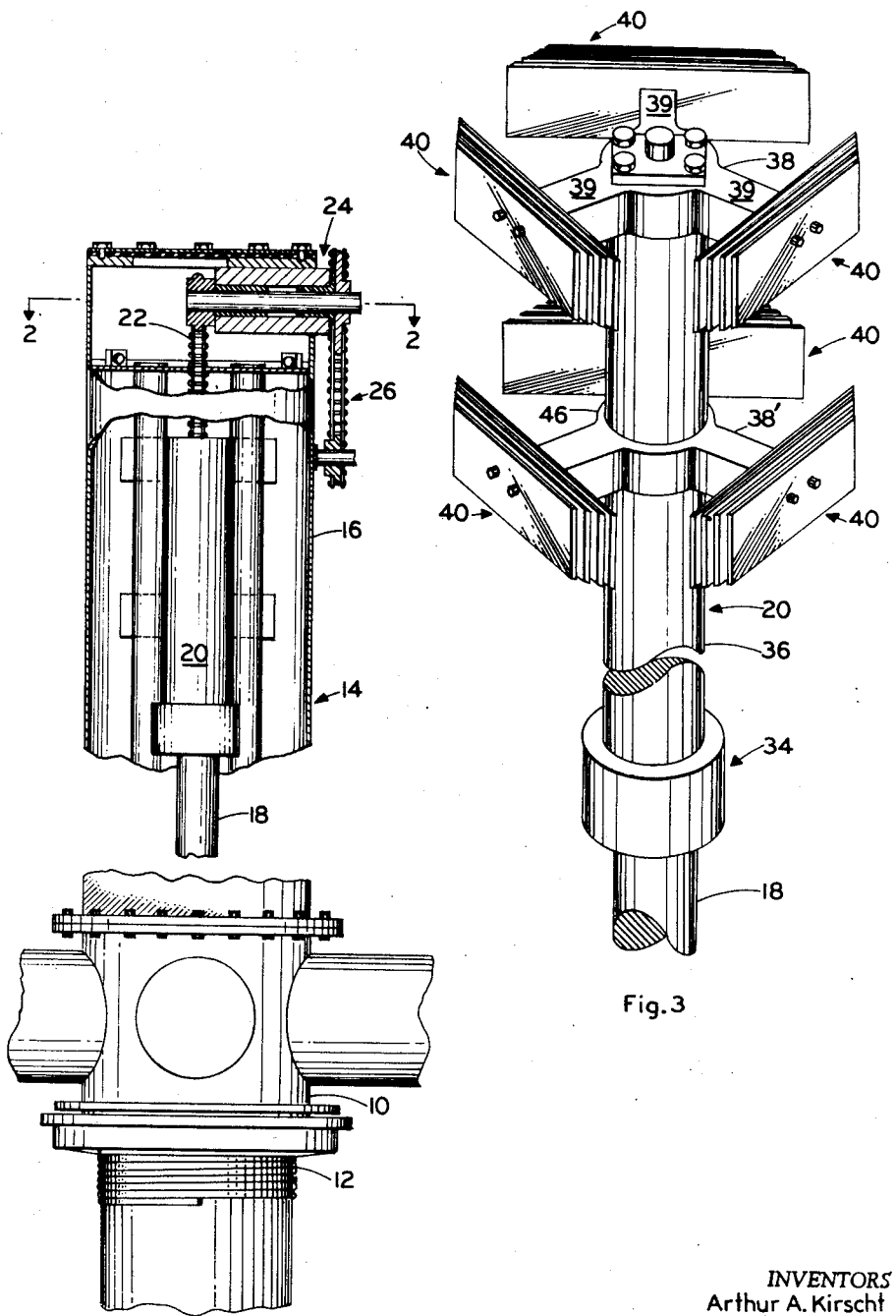
Fig. 1 is a fragmentary elevational view, partly in section, of an exemplary electric arc furnace incorporating a current collector of this invention.

With reference to the drawings and particularly Fig. 1, an electric arc furnace of a type with which this invention is generally concerned comprises a furnace body portion 10 from which is depended a crucible 12 for containing the metal melted during furnace operation. The body is adapted to be supported on a structural frame (not shown). Bolted to the top of the body 10 and extending upwardly therefrom in alignment with the crucible 12 is an electrode housing 14 comprising an elongated hollow metal member in the form of a cylinder 16. A consumable electrode 18 is suspended vertically within the cylinder 16 by means of a current collector and electrode supporting assembly 20 suspended from a chain 22 engaged about a sprocket drive 24 extending outwardly of the cylinder 16 and adapted to be driven by a chain drive 26 connected to suitable drive means, such as the electric motor drive 28 shown in Fig. 2 supported by the electrode housing. As most clearly seen in Fig. 2, a plurality of electrode guide posts 30 are angularly spaced about the axis of the cylinder 16 and extend longitudinally thereof in sliding engagement with the electrode 18 to guide the electrode in its advance relative to the electrode housing. Also, as most clearly seen in Fig. 2, a plurality of elongated channels 32 are mounted externally of the electrode housing and extend longitudinally thereof. These channels, through which cooling water may be circulated, provide means to cool the outer wall of the electrode housing.

Figure 2:
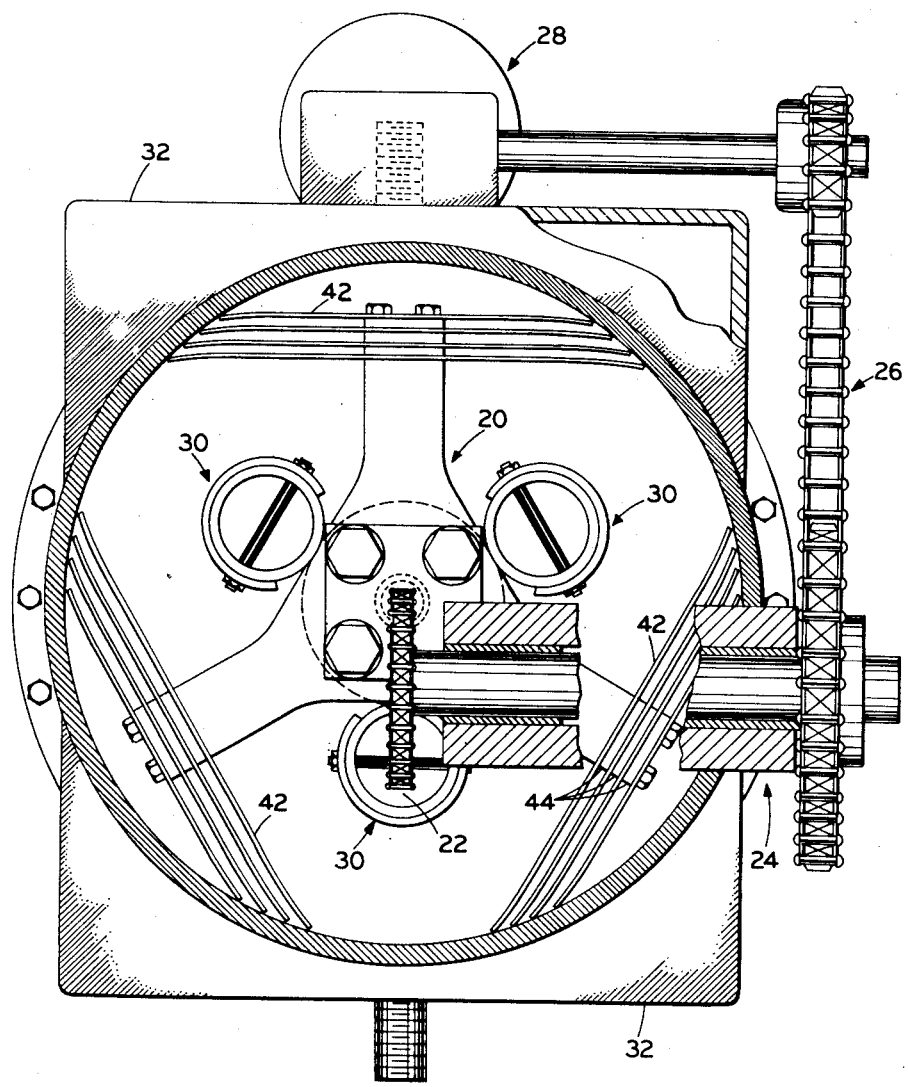
Fig. 2 is an enlarged cross sectional view substantially along the line 2—2 of Fig. 1.

With particular reference to Figs. 2 and 3, the current collector and electrode support assembly 20 comprises an electrode supporting clamp or other suitable device 34 for engaging the upper end of the electrode. The clamp 34 may be of any desired configuration suitable for supporting the electrode in depending relation and for providing an electrical connection between the electrode and a center post or support member 36, the lower end of which carries the electrode clamp 34. The current collector portion of the assembly 20 comprises a three-armed spider 38 bolted to the top end of the supporting member 36 and comprising a plurality of arms 39 extending radially outwardly of the post 36. A set of resilient leaf-type contacts 40 is mounted on the outer ends of each of the spider arms 39 in electrical connection with the spider arms. Specifically, each set 40 of the contacts comprises a plurality of resilient metal, generally rectangular, flat contact members 42 extending at right angles to the spider arms and thus to a radius of the supporting member 36 and cylinder 16. The leaves 42 of each set 40 thereof are spaced longitudinally of the respectively associated spider arm by spacers or blocks 44 fabricated of electrically conductive metal. The leaves 42 in each set 40 thereof vary in length, with the outer leaf being the shortest and with the progressively inner leaves being progressively longer to provide that the outer ends of each leaf extend beyond the outer ends of the next adjacent radially outwardly disposed leaf. The leaves 42 may be fabricated of any suitable resilient electrically conductive metal, such as beryllium copper alloy or a stainless steel, steel being preferred in view of its ability to resist overaging and softening after prolonged usage of the current collector.

As will be apparent from Fig. 3, in the specific embodiment shown, a second group of sets of contacts 40 are disposed below the previously described contacts and are supported by a spider 38' generally similar to the spider 38 previously described, with the exception that the center portion of the spider 38' comprises a collar-like member 46 which encircles and is fixedly secured to supporting member 36. The purpose and advantage of the second group of sets of contacts 40 will be fully apparent hereinafter.

In the operation of a furnace utilizing a current collector of the present invention, external power connections are made to the electrode housing 14 and crucible 12 by suitable means (not shown). The current introduced into the electrode housing, or in other words the cylinder 16, passes through the wall of the cylinder 16 to the contacts 40 through the spider 38 to the central supporting member 36 and thence through the electrode clamp 34 to the electrode 18. A quantity of scrap metal is normally disposed in the bottom of the crucible 12, whereby it is electrically connected to the crucible power source, and thus an arc may be struck between the lower end of the electrode and the quantity of starting material in the bottom of the crucible. The heat from this arc will melt the material of the electrode, the melted material being deposited in the crucible. As will be apparent, the current connection between the contacts 40 and the electrode may be other than as specifically shown, although this particular structure has the advantage of utilizing common parts for structural members as well as for electrical conductors, thus providing a simpler and more economical structure than if separate components were used for these features.

The end edges of the contacts 40, which extend in effect in cantilever fashion in opposite directions from the ends of the spider arms, will resiliently slidably engage the inside of the cylinder 16, as most clearly shown in Fig. 2. Inasmuch as the contacts are resiliently flexible, they will ride over any imperfection or out-of-roundness in the inner wall of the cylinder 16 as the current collector is moved relative to the housing during the melting operation. Thus, these contacts may be designed to accommodate a normal deviation or tolerance of standard commercial piping and make it possible to fabricate the electrode housing from such a piece of pipe with no machining operations required on the inner wall of the pipe other than possibly rust removal.

As will be seen from Fig. 2, at least two contacts are made on the electrode housing inner wall or surface by each single strip of contact material, thus assuring a good electrical contact along the inner wall of the cylinder. Further, the edges of the contacts engaging the wall do so in substantially a line or knife-edge contact and will maintain the wall clean by virtue of the movement of the contacts along the wall so as to ensure efficient electrical connections. The $I^2R$ losses of a current collector constructed in accordance with this invention are relatively low as compared to certain prior art devices, and it is not necessary to provide any separate cooling within the electrode housing for the body of the current collector. Rather, the electrode housing cooling means shown in the drawings provides sufficient cooling of the current collector as well as the electrode housing and, of course, other external cooling means could be utilized on the electrode housing with satisfactory results. While it has been stated that no separate cooling for the current collector is required, that, of course, does not negate the use of cooling means within the electrode housing such as shown in copending application Serial No. 749,977, filed July 21, 1958, in the name of Lloyd W. Johnson and David J. Klee. While the cooling means of this last-mentioned application is primarily intended for providing cooling fluid for a non-consumable electrode carried by the current collector and electrode support assembly, such an arrangement will provide cooling of the current collector portion.

The current collector of this invention has a particular advantage in that a plurality of groups of sets 40 of the contact leaves may be easily stacked in vertical array as shown in Fig. 3 in order to provide higher current carrying capacity. Additionally, it should be noted that the current collector portion of this invention is not limited to use within a consumable electrode arc furnace but will also find utility in electric arc furnaces of the non-consumable electrode type wherein it is still necessary to move the electrode relative to the electrode housing. This latter advantage is particularly apparent in furnaces such as of the general type disclosed herein which are adapted for use with either consumable or non-consumable electrodes.

Therefore, it can be seen that there has been provided a novel and improved current collector for a furnace of the type described whereby a substantially unmachined hollow member may be utilized for the current carrying electrode housing. Further, the permitted stacking of groups of sets of contacts of the type described permits a wide range of current capacity; and since the length of the strips is relatively short, binding of the current collector as it is moved through the furnace is prevented. Additionally, the current collector is of simple construction, requiring relatively few parts which do not require any special manufacturing techniques, thereby providing an economical structure and also one in which the maintenance thereof, such as replacement of contacts, is simple and easy.

While the invention has been described in terms of the specific embodiment shown as well as in terms of a specific furnace application, it is, of course, to be understood that the foregoing description and drawings are merely exemplary in nature; and it is intended that the invention is to be limited only by the appended claims, which shall include within their scope all structure which logically falls within the language of these claims.

What we claim as new and desire to secure by Letters Patent of the United States is:

1. In an electric arc furnace of the type having an electrode housing and a crucible aligned therewith with the electrode housing including an elongated cylindrical metal member having means for the connection thereof to a source of electrical power; means for movably supporting an electrode in said cylindrical member with said electrode extending longitudinally of said cylindrical member, means for moving the electrode supporting means longitudinally of said cylindrical member, and means for providing an electrical connection between said cylindrical member an electrode carried by said supporting means comprising a plurality of sets of electrical contacts arranged angularly about the longitudinal axis of the cylindrical member, each of the sets of contacts including a plurality of resilient leaf type contacts extending parallel to each other and generally chordally of the cylindrical member with each contact being resiliently and slidably engaged with the inner surface of the cylindrical member.

2. In an electric arc furnace of the type having an electrode housing and a crucible aligned therewith with the electrode housing including an elongated cylindrical metal member having means for the connection thereof to a source of electrical power; means for movably supporting an electrode in said cylindrical member with said electrode extending longitudinally of said cylindrical member, means for moving the electrode supporting means longitudinally of said cylindrical member, and means for providing an electrical connection between said cylindrical member and an electrode carried by said supporting means comprising a plurality of sets of metal contacts arranged angularly about the axis of the cylindrical member, each of said sets including a plurality of flat generally rectangular resilient metal plates disposed in parallel planes extending generally chordally of and parallel to the axis of the cylindrical member, the contacts in each set being disposed in overlying stacked relation and being spaced radially of said axis with the ends of each contact resiliently slidably engaging the inner surface of the cylindrical member.

3. In combination with an electric arc furnace of the type including an elongated metal cylinder having means for connecting the same to a source of electrical power, and electrode supporting means within the cylinder movable relative thereto; a current collector disposed entirely within the cylinder and mounted for movement with the electrode supporting means and comprising a spider carried by the supporting means and having a plurality of arms extending generally radially of the cylinder, and a set of flat resilient metal contacts carried by each of the spider arms with each of the contacts in each set extending in opposite directions from and generally at right angles to the respective spider arm, said contacts further extending generally chordally of the cylinder with the general plane of the contacts extending parallel to the longitudinal axis of the cylinder, the contacts in each set thereof being spaced apart radially of the cylinder and progressively increasing in length from the radially outermost contact in each set inwardly of the cylinder so that in each pair of next adjacent contacts in each set thereof the end of the radially innermost contact extends beyond the end of the radially outermost contact of the pair, the ends of each contact of each set thereof being slidably and resiliently engaged with the inner surface of the cylinder.

4. A current collector and electrode support assembly constructed and arranged to be disposed within an elongated cylinder forming a part of an electrode housing of the type described comprising a spider-like member having a plurality of angularly spaced-apart arms extending in coplanar relation therefrom, a set of resilient metal contacts carried by each of the spider arms with each of the contacts in each set extending in opposite directions from and generally at right angles to the respective spider arm and to the general plane of the spider arms, the contacts in each set thereof being spaced apart longitudinally of the respectively associated arm and progressively increasing in length from the outermost contact in each set inwardly of the arm so that in each pair of next adjacent contacts in each set thereof the end of the innermost contacts extends beyond the end of the outermost contact of the pair, and means for supporting an electrode within a cylinder of the type described mounted for movement with the current collector and electrically connected to said contacts.

5. A current collector constructed and arranged to be disposed entirely within an elongated metal cylinder forming a part of an electrode housing of the type described comprising a spider having a plurality of arms spaced angularly about an axis and extending generally radially of said axis, and a set of flat resilient metal contacts carried by each of the spider arms with each of the contacts in each set extending in opposite directions from and generally at right angles to the respective spider arm and parallel to said axis, the contacts in each set thereof being spaced apart longitudinally of the respectively associated spider arm and progressively increasing in length from the outermost contact in each set inwardly of the associated spider arm so that in each pair of next adjacent contacts in each set thereof the end of the innermost contact extends beyond the end of the outermost contact of the pair, the ends of all of the contacts lying substantially in a circle concentric with said axis.

References Cited in the file of this patent

UNITED STATES PATENTS

| | | |
|---|---|---|
| 477,219 | McNellis | June 21, 1892 |
| 659,711 | Stevens | Oct. 6, 1900 |
| 665,882 | Dalzell | Jan. 15, 1901 |
| 737,668 | Schweitzer | Sept. 1, 1903 |
| 2,726,278 | Southern | Dec. 6, 1955 |
| 2,796,450 | Attkins | June 18, 1957 |
| 2,848,524 | McLaughlin et al. | Aug. 19, 1958 |

FOREIGN PATENTS

| | | |
|---|---|---|
| 101,560 | Austria | Nov. 10, 1925 |

UNITED STATES PATENT OFFICE
CERTIFICATE OF CORRECTION

Patent No. 2,942,048            June 21, 1960

Arthur A. Kirscht et al.

It is hereby certified that error appears in the printed specification of the above numbered patent requiring correction and that the said Letters Patent should read as corrected below.

Column 5, line 17, after "member" insert -- and --; column 6, line 26, for "contacts" read -- contact --.

Signed and sealed this 13th day of December 1960.

(SEAL)
Attest:

KARL H. AXLINE
Attesting Officer

ROBERT C. WATSON
Commissioner of Patents